United States Patent
Bertoni et al.

(10) Patent No.: US 8,817,977 B2
(45) Date of Patent: Aug. 26, 2014

(54) METHOD FOR GENERATING A DIGITAL SIGNATURE

(75) Inventors: Guido Marco Bertoni, Monza E Brianza (IT); Ruggero Susella, Milan (IT); Andrea Palomba, Cremona (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 313 days.

(21) Appl. No.: 13/235,089

(22) Filed: Sep. 16, 2011

(65) Prior Publication Data
US 2012/0069994 A1   Mar. 22, 2012

(30) Foreign Application Priority Data

Sep. 16, 2010   (IT) .............................. MI2010A1683

(51) Int. Cl.
*G06F 21/00*   (2013.01)

(52) U.S. Cl.
USPC ................ 380/28; 380/30; 713/176; 713/180

(58) Field of Classification Search
None
See application file for complete search history.

(56) References Cited

U.S. PATENT DOCUMENTS

| | | | | |
|---|---|---|---|---|
| 6,307,935 B1 * | 10/2001 | Crandall et al. | ................ | 380/28 |
| 6,466,668 B1 * | 10/2002 | Miyazaki et al. | ................ | 380/30 |
| 6,795,553 B1 * | 9/2004 | Kobayashi et al. | ............. | 380/28 |
| 6,981,149 B1 * | 12/2005 | Housley et al. | ............... | 713/189 |
| 7,506,165 B2 * | 3/2009 | Kocher et al. | ................. | 713/194 |
| 8,139,763 B2 * | 3/2012 | Boscher et al. | ................ | 380/28 |
| 8,280,039 B2 * | 10/2012 | Futa et al. | ........................ | 380/28 |
| 8,369,517 B2 * | 2/2013 | Venelli et al. | .................... | 380/30 |
| 8,477,935 B2 * | 7/2013 | Langendoerfer et al. | ....... | 380/30 |
| 8,559,625 B2 * | 10/2013 | Douguet et al. | ................ | 380/28 |
| 8,656,175 B2 * | 2/2014 | Haga et al. | ..................... | 713/176 |
| 2008/0301458 A1 | 12/2008 | Ebeid | | |

OTHER PUBLICATIONS

El hadj youssef wajih; Mohsen, Machhout; Rached, Tourki. A Secure Elliptic Curve Digital Signature Scheme for Embedded Devices. SCS 2008. Relevant Pages: 1-6. Pub. Date: 2008. http://ieeexplore.ieee.org/stamp/stamp.jsp?tp=&arnumber=4746874.*

Hutter, M. et al., "Attacking ECDSA-Enabled RFID Devices," ACNS 2009, LNCS 5536, pp. 519-534, 2009.

\* cited by examiner

*Primary Examiner* — Cordelia Zecher
*Assistant Examiner* — Jeremiah Avery
(74) *Attorney, Agent, or Firm* — Seed IP Law Group PLLC (57) ABSTRACT

A method for generating a digital signature includes calculating a first magnitude representative of the inverse of a random number raised to the power two; obtaining a first element of the digital signature by executing scalar multiplication between an established point of the elliptic curve and the random number; obtaining a second magnitude by executing modular multiplication, with modulus corresponding to the established elliptic curve's order between the first magnitude and the secret encryption key; obtaining a third magnitude by executing a modular multiplication, with modulus corresponding to the established elliptic curve's order between the random number and the secret encryption key; obtaining a first addend of a second element of the digital signature by executing a modular multiplication, with modulus corresponding to the established elliptic curve's order between the second magnitude and the third magnitude; and generating a second element of the digital signature based on the first addend.

20 Claims, 4 Drawing Sheets

METHOD FOR GENERATING A DIGITAL SIGNATURE

BACKGROUND

1. Technical Field

The present disclosure refers to digital data cryptography technology and in particular to a method for generating a digital signature for digital data.

2. Description of the Related Art

Nowadays, cryptography performs a fundamental role in the communication of digital data in order to ensure an adequate level of safety of the communication by satisfying requirements as, on the one hand, confidentiality or privacy of the digital data exchanged and, on the other hand, authenticity of the digital data exchanged or of the subjects involved in the communication of the digital data.

With regard to authenticity, in cryptography different so-called digital signature algorithms or methods have been developed that are used, for example, to sign and verify digital documents in order to verify their authenticity. Moreover, such digital signature algorithms or methods are used in systems with relative integrated software (better known by the term "embedded") in order to verify that the software itself is genuine. Furthermore, digital signature algorithms or methods are widely used in the field of smart cards to authenticate digital documents. Moreover, such digital signature algorithms or methods are also adopted in different protocols in the field of communication networks in order to authenticate the identity of the subjects, such as the users or the electronic devices connected to a communication network, in a secure manner.

A known digital signature algorithm or method is the Elliptic Curve Digital Signature Algorithm (ECDSA) belonging to the more general family of Digital Signature Algorithms DSA.

The ECDSA digital signature algorithm is a cryptographic algorithm with a public key that, as known, is based on a non-invertible operation, i.e., an operation that involves a secret key, but through the use of which it is not possible to obtain the secret key used.

The ECDSA digital signature algorithm consists of an algorithm for generating a digital signature and an algorithm for verifying such a digital signature.

The implementation of such algorithms, respectively for generating and verifying a digital signature, involves the preliminary generation, during the step of set-up of the electronic device, of a secret key d and of a public key Y to be used, by the electronic device, in the authentication of the digital data.

The ECDSA algorithm or method for generating a digital signature generates the digital signature (r, s) of a message (M) based on the secret key (d) and on a random number (k) generated whenever the algorithm for generating a digital signature is executed.

In particular, the digital signature consists of determining a pair of elements, i.e.:

a first element (r) of the digital signature representative of the x coordinate of a point obtained from the scalar multiplication of the random number k by a point P of an elliptic curve whose coordinates are set by the NIST (National Institute of Standards and Technology) standard ($r = x_{k \cdot P}$);

a second element (s) of the digital signature obtained with the following mathematical relationship (1):

$$s = (e + r \cdot d) \cdot k^{-1} \bmod n \qquad (1)$$

in which e represents the hash function (per sé known) of the message M to be signed (e=h(M)), r represents the first element of the digital signature, d is the secret encryption key associated with the electronic device, mod n represents the order module n (with n order of the elliptic curve) of the multiplication indicated above.

The ECDSA algorithm for verifying a digital signature carries out a test on the signature generated by the ECDSA algorithm for generating a digital signature based on the public key Y, on the hash function of the message M (e=h(M)), on the digital signature generated (r, s) in order to verify whether the digital signature tested is actually the digital signature generated by the electronic device configured to implement the ECDSA digital signature algorithm.

With particular reference to the ECDSA algorithm or method for generating a digital signature (or in general also an algorithm for generating a digital signature DSA) described above, it is based on a security model studied to be immune to the types of attack developed by crackers who continually try to infringe, from an electronic and/or information point of view, the pre-existing digital signature algorithms DSA in order to recover the secret key in an unauthorized manner and be able to authenticate the digital documents or messages or be able to authenticate themselves at the expense of the legitimate subjects authorized to do so.

Amongst the latest types of attack, it is certainly worth mentioning the types of attack defined as side channel attack.

A side channel attack is an attack by which the recovery of secret information (in particular, the secret key) is obtained by a cracker not by exploiting particular mathematical theory weaknesses but rather by exploiting problems linked to the implementation of the digital signature algorithm or method.

A side channel attack may involve the cracker monitoring the power consumption or electromagnetic radiation or else of injecting a fault (overvoltage or glitch, even undervoltage) into the electronic device configured to implement an algorithm for generating the digital signature DSA. From the comparison between the digital signature obtained from the electronic device in the case of injected fault and the digital signature obtained from the electronic device in normal operation (without perturbations from the cracker) or by monitoring power consumption, a cracker is able to obtain basic information to successfully recover the secret key used by the electronic device under attack.

However, the evolution that these and other types of attack have undergone in recent years has also made the algorithm for generating the digital signature ECDSA vulnerable to infringement with regard to the recovery of the secret key generated.

BRIEF SUMMARY

One embodiment of the present disclosure is a method for generating a digital signature that is an improved alternative to the one described with reference to the prior art and that, in particular, is more robust with respect to the particular types of attack (fault injection and monitoring of power consumption) to which an electronic device configured to implement the aforementioned method for generating a digital signature is subjected.

A method and system for generating a digital signature are described in accordance with embodiments presented herein. In one instance, the techniques include generating a digital signature includes calculating a first magnitude representative of the inverse of a random number raised to the power two; obtaining a first element of the digital signature by executing a scalar multiplication between the random number and the established point on the elliptic curve and then taking the x-coordinate of the result point; obtaining a second magnitude by executing a modular multiplication, with modulus corresponding to the established elliptic curve's order, between the first magnitude and the secret encryption key; obtaining a third magnitude by executing a modular multiplication, with modulus corresponding to the established elliptic curve's order, between the random number and the secret encryption key; obtaining a first addend of a second element of the digital signature by executing a modular multiplication, with modulus corresponding to the established elliptic curve's order, between the second magnitude and the third magnitude; and generating a second element of the digital signature based on the first addend.

BRIEF DESCRIPTION OF THE DRAWINGS

Further characteristics and advantages of the method according to an embodiment will become clear from the following description of preferred embodiments, given for indicating and not limiting purposes, with reference to the attached figures, in which.

DETAILED DESCRIPTION

Figure 1:
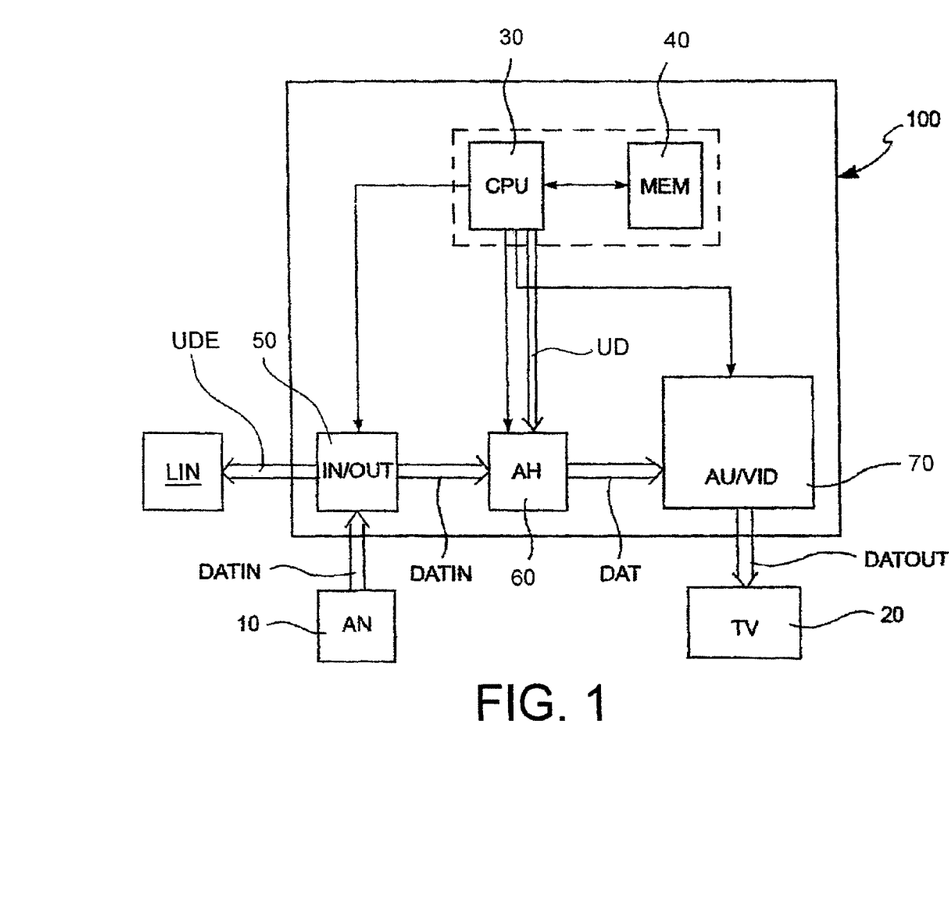
FIG. 1 schematically illustrates an electronic device configured to implement the method for generating a digital signature according to an example embodiment.

With reference to FIG. 1, an example of an electronic device is now described, generally indicated with reference numeral 100, configured to execute the method for generating a digital signature according to an embodiment, which will be described hereafter.

The electronic device 100 of FIG. 1 is, for example, an encoding/decoding device for digital television also known as set top box but, in accordance with other embodiments, it may be any electronic device configured to implement a method for generating a digital signature, for example, a smart card, a cellular telephone, a digital satellite receiver, a digital terrestrial receiver, a games console (for example PS3), a computer (for example a personal computer), a peripheral (for example a printer).

The device may also comprise any digital electronic device arranged to authenticate accessories like, for example, headphones, batteries, ink cartridges, or toner. For example, in a situation where a user typically pays a higher price for an authentic accessory, a counterfeiter may be able to sell a non-original and inferior quality accessory that would be recognized as authentic if it were possible to extract the secret key of the original electronic device.

The encoding/decoding device 100 for digital television is configured to receive a flow of encoded input data DATIN (video and/or audio data) from an external antenna 10 (ANT) in order to supply a corresponding flow of encoded data DATOUT to a television set 20 (TV) operatively connected to the encoding/decoding device 100.

In greater detail, the encoding/decoding device 100 comprises a central processing unit 30 (CPU), for example a microprocessor or a microcontroller, operatively connected to a main system memory 40 (MEM). Moreover, the encoding/decoding device 100 comprises an input/output module 50 (IN/OUT) operatively connected to and controlled by the central processing unit 30 (CPU) in order to receive the flow of encoded input data DATIN.

In addition, the encoding/decoding device 100 comprises an electronic module 60 (AH) arranged for encrypting/decrypting digital data. In greater detail, the electronic module 60 is a hardware accelerator operating under the control of the central processing unit 30 in order to decrypt the flow of encoded data DATIN received from the input/output device 50. Particularly, the hardware accelerator 60 is configured to receive activation signals from the central processing unit 30 to decrypt the flow of encoded data DATIN and send decrypted data DAT to an audio/video decoder 70 (AU/VID) suitable for providing (under the control of the central processing unit 30 to which it is operatively connected) the flow of encoded data DATOUT to the television set 20.

It should be noted that the electronic encoding/decoding device 100 is arranged to load and execute program codes to implement the method for generating the digital signature.

In particular, in the example described, it is the hardware accelerator 60 that is arranged to load and execute the program codes to allow the electronic device 100 to implement such a method. The central processing unit 40 operatively associated with the hardware accelerator 60 is arranged to send the hardware accelerator instructions necessary for loading the data, for starting to execute the method for generating the digital signature, and for reading the outputs.

In the case in which there is not the hardware accelerator, it is the central processing unit 40 that is directly arranged to load and execute the program codes to implement the method for generating the digital signature.

It should be observed that the encoding/decoding device 100 is also configured to allow the interaction of a user with the television broadcasting provider. For example, in the case in which a user wishes to select a television program, it is necessary for the user data UD identifying the subscription to the digital television subscribed by the user to be supplied to the provider. Typically, the user data UD is stored in the main system memory 40 (MEM) of the encoding/decoding device 100. Alternatively, the user data UD is stored in a transportable auxiliary memory (not shown in FIG. 1) operatively interfaced with the central processing unit 30.

In this case, the hardware accelerator 60 is configured to receive the user data UD from the central processing unit 30 and encrypt the user data UD generating encrypted user data UDE. The encoding/decoding device 100 is configured to supply the encrypted user data UDE to the input/output module 50 to be sent to the television broadcasting provider using an external line LIN (for example a telephone line) operatively connected to the encoding/decoding device 100.

Before describing a method for generating a digital signature according to an example embodiment, it is confirmed that it represents one of the three fundamental parts into which it is possible to divide a digital signature protocol or method, to implement which one or more electronic devices (including, for example, the encoding/decoding device 100) are suitably configured in order to be able to authenticate the digital data processed by it or to be able to be authenticated with regard to another device connected to it (for example the television set 20) with a security level that is as suitable as possible.

The other two parts of the digital signature protocol are an algorithm for generating keys (in particular a public key and a secret key) to be associated with an electronic device during its initial configuration and an algorithm for verifying a digital signature to allow the electronic device to verify whether the digital signature generated by the algorithm or method for generating a digital signature is valid.

In terms of time, the algorithm or method for generating the keys and the algorithm for verifying the digital signature are executed, by one or more electronic devices (which may also not necessarily be the same electronic device (for example the electronic device 100), respectively upstream and downstream with respect to the execution, by the electronic device 100, of the algorithm or method for generating a digital signature.

Figure 2:
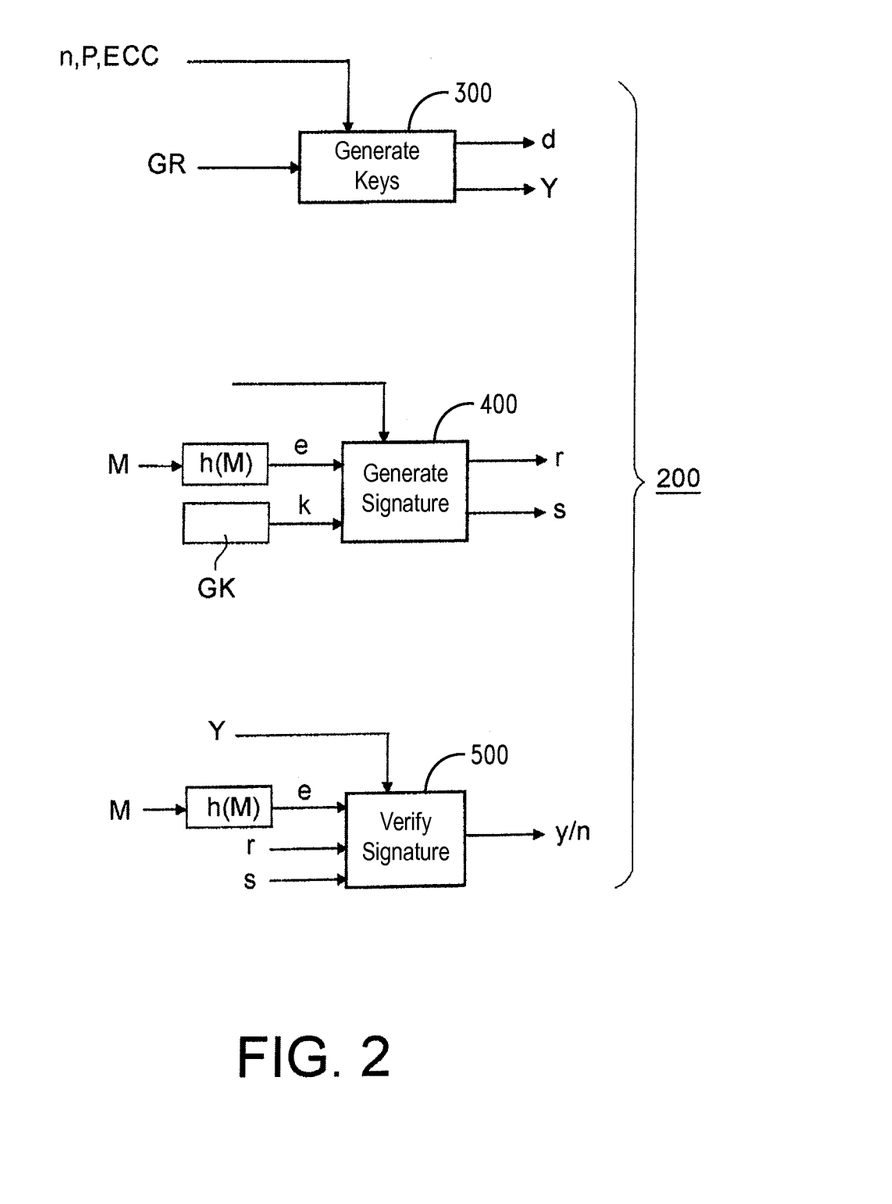
FIG. 2 schematically illustrates the parts that make up a digital signature method comprising a method for generating a digital signature according to an example embodiment, and FIGS. 3 and 4 schematically illustrate, through a block diagram, a method for generating a digital signature according to an example embodiment.

With particular reference to FIG. 2, an ECDSA digital signature protocol or method, indicated with the reference numeral 200, comprises: an algorithm or method for generating keys 300, an algorithm or method for generating a digital signature 400, and an algorithm or method for verifying a digital signature 500.

The algorithm or method for generating keys, known to one skilled in the art of cryptography, is implemented by an electronic device, not necessarily the electronic device 100, at the moment of initial configuration of the electronic device 100 in order to be able to associate the electronic device with a secret key d and a public key Y (to be used thereafter for the authentication of digital data).

It should be noted that the generation of such a secret key d and of such a public key Y is carried out from security parameters such as the parameters of an established elliptic curve ECC (Elliptic Curve Cryptography) on which the ECDSA digital signature algorithm set by the NIST (National Institute of Standards and Technology) standard is based. Such parameters of the established elliptic curve are, for example, a first value n representative of an established order of the elliptic curve, the coordinates of a base point P (or generator point) of the elliptic curve, and the parameters of the equation of the elliptic curve.

Based on these security parameters, the secret key d may be generated by the user who is configuring the electronic device 100 as a random number smaller than the first value n representative of an established order of the curve (d<n) through a generator of random numbers GR, whereas the public key Y is generated by executing the scalar multiplication between the secret key d and the base point P of the elliptic curve the coordinates of which are set by the NIST standard (Y=d·P).

The algorithm or method for generating a digital signature 400, at the general level, is executed by the electronic device 100 (in particular by the hardware accelerator 60 or if it is absent, by the central processing unit 40) in order to generate a first element r and a second element s representative of the digital signature based on the secret key d, of the hash function, per sé known, of a message M to be signed (e=h(M)) and of a random number k generated by a further generator of random numbers GK.

It should be noted that the algorithm or method for generating a digital signature 400, object of the present disclosure, will be described in greater detail with particular reference to FIG. 3.

Going back once more to FIG. 2, the algorithm or method for verifying the digital signature 500 is implemented by the electronic device 100 in order to verify whether or not the digital signature executed on the message M is correct. In particular, such an algorithm or method for verifying a digital signature 500 executes such a verification based on the public key Y, the hash function of the signed message M and on the first element r and on the second element s representative of the digital signature.

It should be noted that the algorithm or method for verifying a digital signature 500 is per sé known to the man skilled in the art of cryptography and will not be described in any greater detail in the present description.

With reference now to the block diagram of FIGS. 3 and 4, an algorithm or method 400 for generating a digital signature (r, s) according to an example embodiment will now be described.

The method for generating a digital signature 400 is based on the use of an established mathematical curve, preferably elliptic, of established order n, both set by a standard, for example the NIST standard.

At the general level, it is confirmed that the generation of a digital signature is in the form of the generation of a pair of values, in particular a first element r of the digital signature and a second element s of the digital signature, as will be explained hereafter in greater detail.

Figure 3:
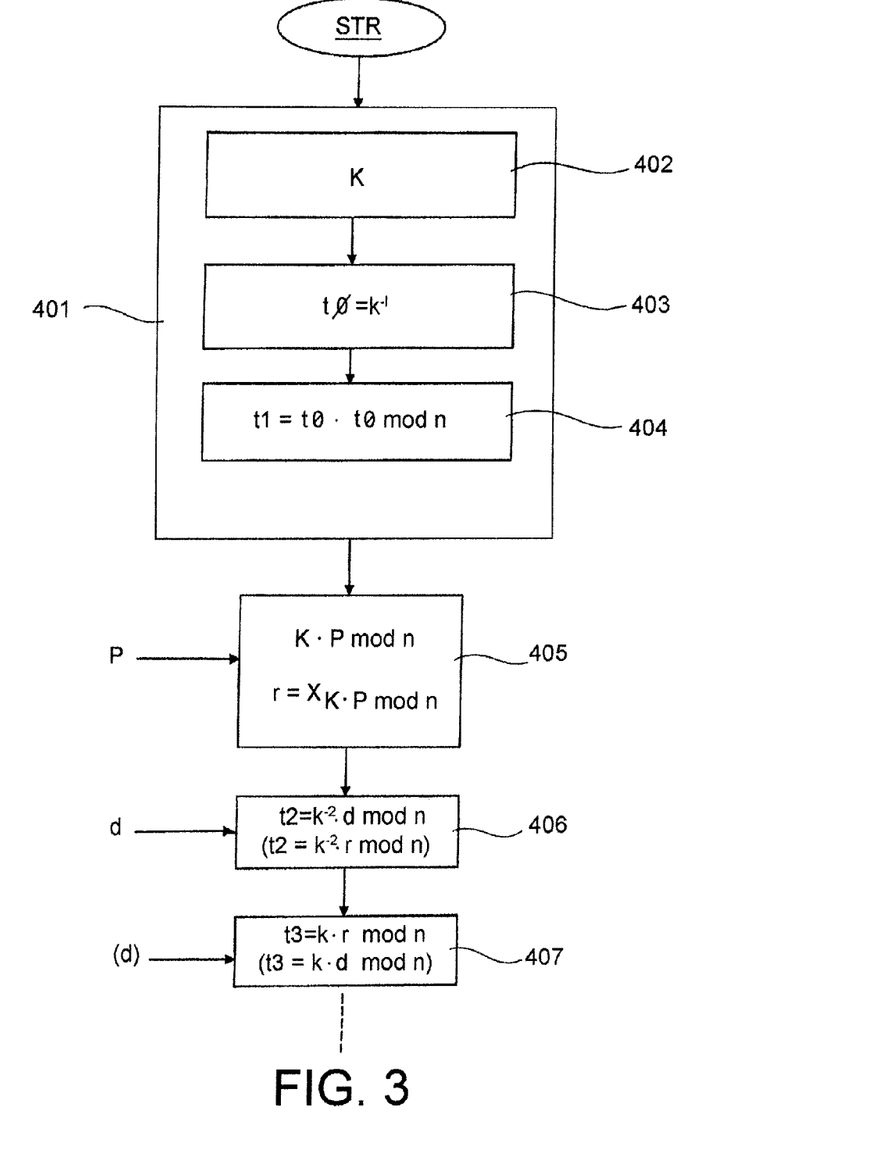
Figure 4:
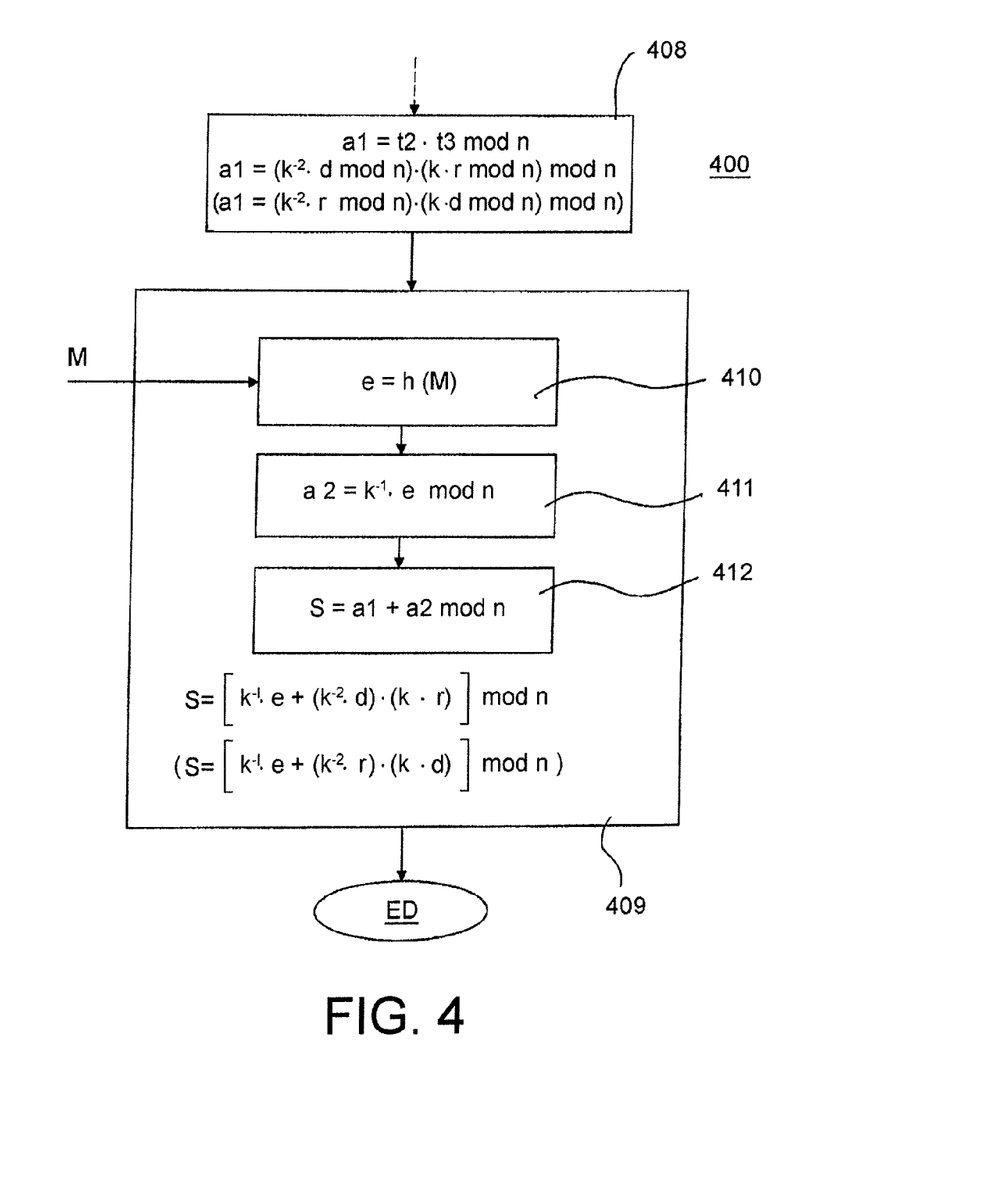

With reference to FIG. 3, the method 400 for generating a digital signature (r, s) comprises a symbolic start step STR.

The method 400 for generating a digital signature (r, s) also comprises a step of calculating 401, by the electronic device 100 having an associated secret encryption key d, a first magnitude t1 representative of the inverse of a random number k raised at least to the power of two ($t1=k^{-2}$).

In particular, such a step of calculating 401 the first magnitude t1 comprises a step of generating 402, by the electronic device 100, in particular through the further generator of random numbers GK, the random number k. It should be noted that the random number k is generated by the electronic device 100 upon each execution of the method 400 for generating a digital signature (r, s). Therefore, advantageously, the random number k generated during a first execution of the method 400 for generating a digital signature (r, s) will be different from the random number generated during a second execution, after the first, of the same method 400 for generating a digital signature (r, s).

Such a step of calculating 401 the first magnitude t1 also comprises a step of calculating 403, by the electronic device 100, a further magnitude t0 representative of the inverse of the random number k ($t0=k^{-1}$).

Such a step of calculating 401 the first magnitude t1 also comprises a step of executing 404, by the electronic device 100, a modular multiplication, corresponding to the established elliptic curve's order n of the further magnitude (t0) by itself at least twice in order to obtain the first magnitude $t1=(t0 \cdot t0) \bmod n=(k^{-1} \cdot k^{-1}) \bmod n=(k^{-2}) \bmod n$.

The method 400 for generating a digital signature (r s) also comprises a step of executing 405, by the electronic device 100, a scalar multiplication between the random number k and an established point P of the established elliptic curve in order to obtain the first element r of the digital signature (r, s).

In particular, the first element r of the digital signature (r, s) corresponds to the x coordinate of the result obtained from the aforementioned scalar multiplication ($r=x_{k \cdot P}$).

The method 400 for generating a digital signature (r, s) comprises a step of executing 406, by the electronic device 100, a modular multiplication, with modulus corresponding to the established elliptic curve's order n, between the first magnitude t1 and the secret key d in order to obtain a second magnitude t2 ($t2=(t1 \cdot d) \bmod n=(k^{-2} \cdot d) \bmod n$).

Moreover, the method 400 for generating a digital signature (r, s) also comprises a step of executing 407, by the electronic device 100, a modular multiplication, with modulus corresponding to the established elliptic curve's order n, between the random number k and the first element r of the digital signature (r, s) in order to obtain a third magnitude t3 ($t3=k \cdot r$).

With reference to the last two steps described, it should be noted that in a further embodiment, the method 400 for generating a digital signature (r, s) comprises a step of executing 406, by the electronic device 100, a modular multiplication, with modulus corresponding to the established elliptic curve's order n, between the first magnitude t1 and the first element r of the digital signature (r, s), instead of the secret encryption key d, in order to obtain the second magnitude t2 (t2=(t1·r)mod n=($k^{-2}$·r)mod n).

Correspondingly, in the same further embodiment, the method 400 for generating a digital signature (r, s) also comprises a step of executing 407, by the electronic device 100, a modular multiplication, with modulus corresponding to the established elliptic curve's order n, between the random number k and the secret encryption key d, instead of the first element r of the digital signature (r, s), in order to obtain a third magnitude t3 (t3=k·d).

Therefore, in general terms, the method 400 for generating a digital signature (r, s) comprises a step of executing 406, by the electronic device 100, a modular multiplication, with modulus corresponding to the established elliptic curve's order n, between the first magnitude t1 and one from the secret encryption key d and the first element r of the digital signature (r, s), in order to obtain a second magnitude t2.

Thereafter, the method 400 for generating a digital signature (r, s) comprises a step of executing 407, by the electronic device 100, a modular multiplication, with modulus corresponding to the established elliptic curve's order n, between the random number k and the other from the secret encryption key d and the first element (r) of the digital signature, in order to obtain a third magnitude t3.

Thereafter, the method 400 for generating a digital signature (r, s) also comprises a step of executing 408, by the electronic device 100, a modular multiplication, with modulus corresponding to the established elliptic curve's order n, between the second magnitude t2 and the third magnitude t3 in order to obtain a first addend a1 of a second element s of the digital signature (r, s) (a1=t2·t3 mod n; a1=($k^{-2}$·d)·(k·r) mod n, in the case of the first example described; a1=($k^{-2}$·r)·(k·d) mod n, in the case of the further example described).

The method 400 for generating the digital signature (r, s) also comprises a step of generating 409, by the electronic device 100, the second element s of the digital signature (r, s) based on such a first addend a1 and on a further magnitude e representative of a message M to be signed.

It should be noted that, for the purposes of the present description, by message M it is meant the set of digital data for which it is necessary for the electronic device 100 to carry out its signature through the implementation of the digital signature algorithm 500. As already stated earlier, such digital data can be both information relating to data to be transmitted or received through the electronic device or else information relating to the electronic device itself. In the case of the example of electronic device described with reference to FIG. 1, encoding/decoding device for digital television, the electronic device 100 and the television set exchange digital data that has been digitally signed so as to carry out a mutual authentication to verify for both that they are authentic. In this way it is advantageously possible to recognize the television set as such and not as a storage system that is attempting to store an unauthorized copy of the flow of digital data supplied by the encoding/decoding device 100 (pay-tv event, multimedia content of a DVD, and so on).

Going back to the step of generating 409 the second element s of the digital signature (r, s), it also comprises a step of calculating 410, by the electronic device 100, the further magnitude e representative of the message M as a hash function, per sé known since it is defined by the NIST standard, of such a message M (e=h(M)).

Moreover, such a step of generating 409 the second element s of the digital signature (r, s) also comprises a step of executing 411, by the electronic device 100, a modular multiplication, with modulus corresponding to the established elliptic curve's order n, between the further magnitude e representative of the message to be signed M and the further magnitude t0 representative of the inverse of the random number k, in order to obtain a second addend (a2) of the second element s of the digital signature (r, s) (a2=(t0·e) mod n=($k^{-1}$·e) mod n).

Furthermore, such a step of generating 409 the second element s of the digital signature (r, s) comprises a step of executing 412, by the electronic device 100, a modular sum, using the established order as modulus between the first addend a1 of the second element s of the digital signature (r, s) and the second addend a2 of the second element s of the digital signature (r, s): s=(a1+a2) mod n.

In particular, in the case of the first example described, the second component s of the digital signature (r, s) will be obtained with the following mathematical relationship (2):

$$s=((k^{-1}·e)+(k^{-2}·d)·(k·r))\bmod n \qquad (2)$$

In the case of the second example described, the second component s of the digital signature (r, s) will be obtained with the following mathematical relationship (2'):

$$s=((k^{-1}·e)+(k^{-2}·r)·(k·d))\bmod n \qquad (2')$$

The method 400 for generating a digital signature (r, s) symbolically concludes with an end step ED.

The advantages of the method 400 for generating a digital signature ECDSA according to the examples just described can be explained by making a comparison with the method for generating a digital signature ECDSA described with reference to the prior art in which the digital signature s of a message is obtained with the following mathematical relationship (1):

$$s=(e+r·d)·k^{-1} \bmod n \qquad (1)$$

The types of side channel attack, per sé known, allow the cracker to exploit the problems linked to the implementation of the algorithm or method for generating a digital signature. In particular, the most vulnerable parts with respect to these types of attack are multiplication operations.

It should be noted that whilst there are two multiplication operations present in the mathematical relationship (1) of the method for generating the digital signature of the prior art, on the other hand there are five operations present in the mathematical relationship (2) of the method for generating the digital signature according to the example of the invention.

Such operations are characterized by containing values dependent on the random number k and this actually increases the quality of the operations themselves increasing the safety of the method for generating the digital signature proposed with respect to that of the prior art against side channel attacks.

Moreover, the method of the example of the invention is also more resistant to attacks against multiplication operations with respect to the method of the prior art thanks to the fact that the secret key d in the mathematical relationship (2) is sequentially multiplied by a magnitude unknown to the cracker ($k^{-2}$) since the random number k is generated upon every execution, by the electronic device 100, of the method for generating the digital signature 400.

As can be worked out from the mathematical relationship (1), in the prior art the secret key d is on the other hand multiplied by the magnitude r (first element of the digital signature) that the cracker knows, since it is part of the emitted signature.

Consequently, possible attacks with injection of a fault into or with measurement (monitoring) of the power consumption or of the radiation of the electronic device 100 during implementation, by the latter, of the method for generating the digital signature 400 can give results unsuitable either for finding the correct digital signature s or for acquiring fundamental information that can lead to the actual recovery of the secret key d.

For example, with reference to the described embodiment, a cracker can inject a fault (power glitch) into the electronic device 100 to perturb the calculation of the second magnitude $t2=(k^{-2} \cdot d) \bmod n$ and thus obtain a perturbed second magnitude $t2'=(t2+\epsilon d_i) \bmod n$. Despite this, it is not possible to obtain the difference magnitude $\Delta=(s'-s) \bmod n = \epsilon d_i(k \cdot r) \bmod n$ since there is the random number k that is unknown and therefore the cracker is unable to recover the correct digital signature s.

According to another example, again with reference to the first embodiment described, a cracker can inject a fault into the electronic device 100 to perturb the calculation of the second addend $a2=((k^{-2} \cdot d) \bmod n \cdot (k \cdot r) \bmod n) \bmod n$ of the second component s of the digital signature (r, s). The cracker can obtain the difference magnitude $\Delta=(s'-s) \bmod n = \epsilon (k^{-2} \cdot d)_i \bmod n$, in which $(k^{-2} \cdot d)_i$ indicates the i-th word of the second magnitude $t2=(k^{-2} \cdot d) \bmod n$. The cracker is therefore able to have information on the second component s of the digital signature (r, s) but, despite this, the information obtained concerning the second magnitude t2 cannot be used to post the attack since the random number k is different and unknown every time the electronic device 100 executes the method 400 for generating the digital signature (r, s).

It should be noted that the method for generating a digital signature, according to both of the examples described, can be executed by an electronic processor equipped with a memory arranged to load a program code corresponding to the steps of the aforementioned method.

Thanks to the nature of the operations introduced, the method for generating a digital signature described herein is more robust with respect to that of the prior art.

Such operations are modular multiplications and inversions still having a computing cost advantageously comparable with respect to the prior art.

Again advantageously, no further random number is required, in addition to the random number k already present in the method of the prior art, for the implementation of the method for generating a digital signature according to an embodiment described herein. This is due to the fact that the generation of a random number is a rather onerous task.

Finally, the method for generating a digital signature described herein developed on the scheme of the digital signature algorithm of the ECDSA type may be adapted to the scheme of another digital signature algorithm, for example the digital signature algorithm DSA.

A man skilled in the art can bring modifications, adaptations and replacements of elements with others that are functionally equivalent to the embodiments of the method described above, in order to satisfy contingent requirements, without departing from the scope of the following claims. Each of the characteristics described as belonging to a possible embodiment can be made independently from the other embodiments described.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method comprising:
   generating a digital signature using an established elliptic curve having an order, the generating being performed under control of one or more computer systems configured with executable instructions and having an associated secret encryption key, and including:
   calculating a first magnitude representative of an inverse of a random number raised at least to the power two;
   obtaining a first element of a digital signature by executing a scalar multiplication between an established point of the established elliptic curve and the random number;
   obtaining a second magnitude by executing a modular multiplication, with modulus corresponding to the order of the established elliptic curve, between the first magnitude and one of the secret encryption key and the first element of the digital signature;
   obtaining a third magnitude by executing a modular multiplication, with modulus corresponding to the order of the established elliptic curve order, between the random number and one of the secret encryption key and the first element of the digital signature;
   obtaining a first addend by executing a modular multiplication, with modulus corresponding to the order of the established elliptic curve, between the second magnitude and the third magnitude; and
   generating a second element of the digital signature based at least in part on the first addend.

2. The computer-implemented method according to claim 1, wherein the generating the second element includes calculating a fourth magnitude of a hash function of a message, wherein the second element is based at least in part on the fourth magnitude.

3. The computer-implemented method according to claim 2, wherein generating the second element also includes executing a modular multiplication, with modulus corresponding to the order of the established elliptic curve, between the fourth magnitude and a fifth magnitude representative of the inverse of the random number, in order to obtain a second addend of the second element of the digital signature.

4. The computer-implemented method according to claim 3, wherein the generating the second element includes executing a modular sum, using the order of the established elliptic curve as modulus between the first addend and the second addend.

5. The computer-implemented method according to claim 1, wherein the calculating the first magnitude includes generating the random number.

6. The computer-implemented method according to claim 5, wherein the calculating the first magnitude also includes calculating a fourth magnitude representative of the inverse of the random number.

7. The computer-implemented method according to claim 6, wherein the calculating the random number also includes executing a modular multiplication, with modulus corresponding to the order of the established elliptic curve, of the fourth magnitude by itself at least twice in order to obtain the first magnitude.

8. An electronic device comprising:
a central processing unit; and
a main system memory operatively connected to a central processing unit having instructions stored thereon that, when executed on the central processing unit, cause the central processing unit to:
calculate a first magnitude representative of an inverse of a random number raised at least to the power two;
obtain a first element of a digital signature by executing a scalar multiplication between the random number and an established point on an elliptic curve and then taking an x-coordinate of the resulting point;
obtain a second magnitude by executing a modular multiplication, with modulus corresponding to an order of the established elliptic curve, between the first magnitude and one of a secret encryption key and the first element of the digital signature;
obtain a third magnitude by executing a modular multiplication, with modulus corresponding to the order of the established elliptic curve, between the secret encryption key and the first element of the digital signature;
obtain a first addend by executing a modular multiplication, with modulus corresponding to the order of the established elliptic curve, between the second magnitude and the third magnitude; and
generate a second element of the digital signature based at least in part on the first addend.

9. The electronic device according to claim 8, wherein the electronic device is one of: an encoding and decoding apparatus for digital television or set top box, a smart card, a cellular telephone, a digital satellite receiver, a digital terrestrial receiver, a games console, a computer, and a peripheral device configured to authenticate accessories.

10. The electronic device according to claim 8, wherein the instructions that cause the central processing unit to generate the second element further cause the central processing unit to calculate a fourth magnitude of a hash function of a message, wherein the second element is based at least in part on the fourth magnitude.

11. The electronic device according to claim 10, wherein the instructions further cause the central processing unit to execute a modular multiplication, with modulus corresponding to the order of the established elliptic curve, between the fourth magnitude and a fifth magnitude representative of the inverse of the random number, in order to obtain a second addend of the second element of the digital signature.

12. The electronic device according to claim 11, wherein the instructions further cause the central processing unit to execute a modular sum, using the order of the established elliptic curve as modulus between the first addend and the second addend.

13. The electronic device according to claim 8, wherein the instructions that cause the central processing unit to calculate the first magnitude further cause the central processing unit to generate the random number.

14. The electronic device according to claim 13, wherein the instructions that cause the central processing unit to calculate the first magnitude further cause the central processing unit to calculate a fourth magnitude representative of the inverse of the random number.

15. A non-transitory computer-readable medium having computer-executable instructions stored thereon that, when executed on a computer, cause the computer to:
calculate a first magnitude representative of an inverse of a random number raised at least to the power two;
obtain a first element of a digital signature by executing a scalar multiplication between an established point of an established elliptic curve and the random number;
obtain a second magnitude by executing a modular multiplication, with modulus corresponding to an order of the established elliptic curve, between the first magnitude and one of the secret encryption key and the first element of the digital signature;
obtain a third magnitude by executing a modular multiplication, with modulus corresponding to the order of the established elliptic curve, between the random number and one of the secret encryption key and the first element of the digital signature;
obtain a first addend by executing a modular multiplication, with modulus corresponding to the order of the established elliptic curve, between the second magnitude and the third magnitude; and
generate a second element of the digital signature based at least in part on the first addend.

16. The non-transitory computer-readable medium according to claim 15, wherein the instructions that cause the computer to generate the second element further cause the computer to calculate a fourth magnitude of a hash function of a message, wherein the second element is based at least in part on the fourth magnitude.

17. The non-transitory computer-readable medium according to claim 16, wherein the instructions further cause the computer to execute a modular multiplication, with modulus corresponding to the order of the established elliptic curve, between the fourth magnitude and a fifth magnitude representative of the inverse of the random number, in order to obtain a second addend of the second element of the digital signature.

18. The non-transitory computer-readable medium according to claim 17, wherein the instructions further cause the computer to execute a modular sum, using the order of the established elliptic curve as modulus between the first addend and the second addend.

19. The non-transitory computer-readable medium according to claim 15, wherein the instructions that cause the computer to calculate the first magnitude further cause the computer to generate the random number.

20. The non-transitory computer-readable medium according to claim 19, wherein the instructions further cause the computer to execute a modular multiplication, with modulus corresponding to the order of the established elliptic curve, of a fourth magnitude by itself at least twice in order to obtain the first magnitude.

* * * * *